S. H. SHEIB.
PROCESS FOR RECOVERY OF BATTERY FLUIDS.
APPLICATION FILED NOV. 30, 1917.
1,281,857.
Patented Oct. 15, 1918.
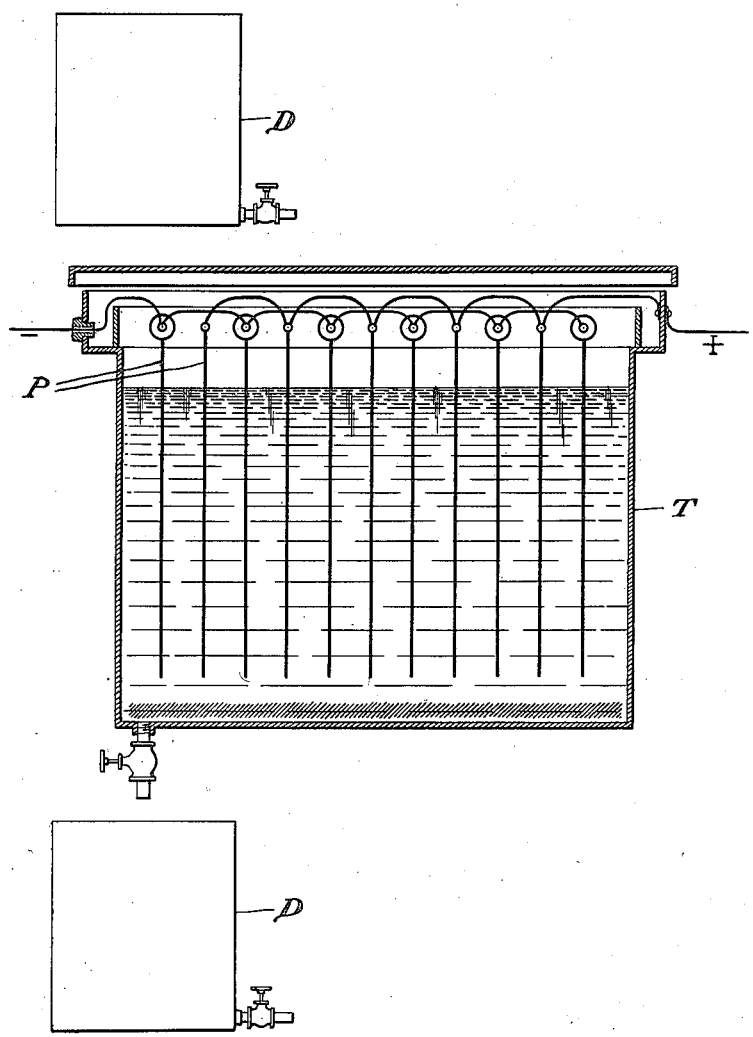
Inventor
Samuel H. Sheib
By Mason Fenwick Lawrence,
Attorneys

UNITED STATES PATENT OFFICE.

SAMUEL H. SHEIB, OF RICHMOND, VIRGINIA, ASSIGNOR OF ONE-THIRD TO HENRY FROEHLING AND ONE-THIRD TO HENRY C. FROEHLING, BOTH OF RICHMOND, VIRGINIA.

PROCESS FOR RECOVERY OF BATTERY FLUIDS.

1,281,857.  Specification of Letters Patent.  Patented Oct. 15, 1918.

Application filed November 30, 1917. Serial No. 204,799.

*To all whom it may concern:*

Be it known that I, SAMUEL H. SHEIB, a citizen of the United States, residing at Richmond, in the county of Henrico and State of Virginia, have invented certain new and useful Improvements in Processes for Recovery of Battery Fluids; and I do hereby declare the following to be a full, clear, and exact description of the invention, such as will enable others skilled in the art to which it appertains to make and use the same.

This invention relates to processes and particularly relates to a process for the rejuvenation of alkaline electrolyte fluid.

At present the exhausted alkaline electrolyte of primary batteries is discarded and the battery must be charged with a fresh alkaline fluid, this discarding of the used alkaline fluid resulting in both a waste of the caustic soda of which it is made as well as also a waste of the sodium zincate which is formed by the action of the battery, and it is one of the objects of the present invention to save both the caustic soda, and also the zinc by-product, and particularly it is an object of the invention to rejuvenate the used alkaline electrolyte so that it may again be utilized to charge batteries.

With the above objects in view, and others as will be rendered manifest to those skilled in the art, the invention consists in the process for rejuvenating alkaline battery fluid hereinafter more particularly described, one form of apparatus enabling the practice of the process, being illustrated in the accompanying drawing.

The process consists in electrolyzing the spent battery fluid in a suitable tank constructed preferably of wrought iron plates of high purity, using positive electrodes of the same material, or of carbon, and negative electrodes of any convenient metal, preferably iron or zinc, whereby the sodium zincate in solution is decomposed into caustic soda and zinc, the latter being deposited on the cathode in metallic form and the solution restored to its original concentration and condition and thereby being rendered suitable for re-charging batteries.

Since the liquid contains approximately ten ounces of zinc per gallon, and since the removal of this zinc restores the liquid to its original strength and condition, there is nothing to prevent the solution being used repeatedly as battery fluid, removing the zinc by electrolysis each time the batteries are renewed. To effect this the exhausted battery fluid may be collected in iron drums D and carried to the point where the electrolysis is to be carried out. As iron is not attacked by caustic soda, vessels of this material should be use throughout.

The process can be easily carried out by raising the electrolytic tank on the platform with a second platform above it, and a floor below. Since the fluid is always mixed with some oil, the contents of the drums, on arrival should be at once transferred to the higher platform, and the liquid allowed to stand at least thirty minutes, during which interval practically all the oil will rise to the surface. The drums can now be emptied into a separating tank T by drawing off the liquid from the bottom, and allowing it to flow into the tank, keeping back the oil, which is to be collected separately, and used again when recharging batteries.

After the tank is filled with the solution the plates P are immersed in it, connected with the source of current, and electrolyzed until all the zinc is deposited in metallic condition on the cathode. Rejuvenated liquid is now drawn off into iron drums and is ready to be used for recharging batteries. The metallic zinc adhering to the cathode is scraped off, washed several times with water to remove the excess of caustic soda absorbed in it, then placed in a press and freed from as much moisture as possible, after which it is ready for melting down. The zinc obtained by this process will be found to be of exceptionally high purity.

The caustic soda should not be exposed to the air any longer than is absolutely necessary, since it absorbs carbon dioxid, thereby becoming converted into carbonate of soda. In the battery this is prevented by the layer of oil, but after the solution has been repeatedly handled, it may have accumulated sufficient carbon dioxid to weaken it perceptibly, thereby shortening the life of the cells. When this occurs, it will only be necessary to add sufficient new caustic to raise the specific gravity to 1,400, or to evaporate to this density and allow the solution to stand covered with oil, or inclosed in drums, until the carbonate of soda which is much less soluble than the caustic soda, precipitates, after which the solution may be drawn off, and diluted to 1,250 specific gravity, when it is ready for use again. The carbonate of soda which is precipitated by this procedure is well suited for use as boiler compound, if it can be obtained in sufficient quantity, but with proper care in the handling of the caustic soda, there will be very little carbonate formed.

The chemistry of the changes which occur in the battery cell is expressed in the following reactions:

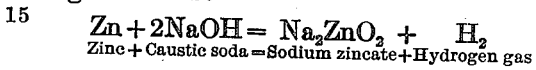

The zinc is attacked by the caustic soda forming sodium zincate and hydrogen. The hydrogen which would otherwise polarize the battery and interfere with its efficiency is combined at the positive (copper oxid) plate with the oxygen of the copper oxid, thus, the products being water and metallic copper.

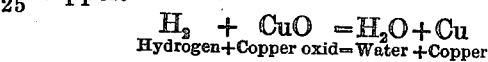

The zinc is entirely consumed, passing into solution. The copper oxid is reduced to metallic copper, and hence the positive plates will become exhausted in course of time and require renewal.

The first reaction is reversed during the electrolysis of the soda solution, as follows:

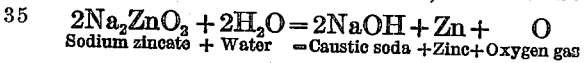

The zinc is deposited as metal on the cathode, the oxygen escapes as gas at the anode, and there remains only the caustic soda in solution.

It will be observed that during the action of the battery in service, one molecule of water is formed for each two molecules of caustic soda acted upon. For each two pounds of caustic soda, (the approximate weight in each battery charge), this amounts to .45 lb. of water. It might be thought that by repeated use of the battery fluid the constant formation of water would eventually render the solution too dilute for use. It will be noted, however, that when the solution is electrolyzed, there is one molecule of water destroyed for every two molecules of caustic soda that are re-formed, hence the solution is restored to its exact original concentration and condition.

The process, it will be noted, is an almost perfect one. All of the original materials except the copper oxid plates are recovered and restored to their original condition.

*Operation.*

After filling the tank with the liquid all connections should be inspected and good electrical contact insured. The current is then turned on, the tank covered, and left for a suitable period, say six hours. At the expiration of this time a small quantity of the liquid is removed and to it is added a few drops of a solution of ammonium sulfid. The appearance of a white precipitate indicates that the process is not yet complete. The test is to be repeated at intervals of 15 minutes, until the absence of the white precipitate on adding ammonium sulfid indicates the complete removal of zinc. The complete removal of the zinc is also indicated by the profuse liberation of hydrogen gas at the negative plates. This begins imperceptibly and increases until at the end of the process the solution becomes milky white from the myriads of small bubbles rising through it.

The solution is now immediately drained from the tank into the iron drums, tightly sealed and is now ready for use.

The tanks and plates are at once washed with a stream of water from a hose, any loosely adhering zinc is scraped off and allowed to collect in the tank, after which it is churned up with water, drained, and this process repeated several times to remove the excess of soda absorbed in the sponge. After a final draining the zinc is collected in bags or press cloths, and pressed as nearly dry as possible, after which it is ready for melting down and casting into pig or plate; as already stated the zinc thus obtained will be found to be of exceptionally high purity.

For the source of current a D. C. generator delivering four to six volts and 1000 (or more) amperes will be most satisfactory and economical. It will be understood that the length of time required for the run can be shortened by the employment of heavier currents, but we believe a current density of 15 amperes per square foot of cathode surface will be practical and economical and that a generator of the size indicated above will be well suited for the work.

On a 250 gallon run, this being the amount for which the tank is designed, the yield will be:

|  | Approximate value. |
|---|---|
| Zinc, 156 lbs | $15.60 |
| Caustic, 500 lbs | 50.00 |
| Oil, 5.87 galls | 2.34 |
|  | $67.94 |

The necessary current for refining 250 gallons, using the equipment designed, will be as follows:

1050 amperes, 3 volts=3150 watts=3.15 K. W.

Time of run, 7 hours=22.05 kilowatt hours, at 10¢ per K. W. H.=$2.21.

We cannot, obviously, estimate the cost of collecting or transporting the material, but it should not require the services of more than one man to operate the equipment. During the run of six hours the apparatus will require practically no attention, and hence the operator may employ this time for other work.

By employing two sets of cathode plates for the tank, the operator may scrape and wash one set of plates while the other is in use.

What is claimed is:

1. The restoration of used alkaline, primary battery fluid which consists in removing any oily content from the solution, then electrolyzing it to separate the zinc and adding caustic soda to increase the specific gravity.

2. The method of treating used alkaline electrolyte of primary batteries which consists in collecting the fluid in a drum, maintaining the fluid quiescent therein until oils therein have risen, then running the fluid from the bottom of the drum into a receiver and subjecting it to the action of an electric current to separate the zinc.

3. The method of treating used alkaline, primary battery fluid which consists in removing the oily content from the solution, and electrolyzing the residue and impure solution to separate the zinc content from the caustic soda.

In testimony whereof I affix my signature.

SAMUEL H. SHEIB.